May 17, 1966  J. R. MILES  3,251,130
ELECTRICAL OUTLET BOX AND TOOL FOR INSTALLING THE SAME
Filed June 17, 1964

INVENTOR
Joseph R. Miles

United States Patent Office 3,251,130
Patented May 17, 1966

3,251,130
ELECTRICAL OUTLET BOX AND TOOL FOR INSTALLING THE SAME
Joseph R. Miles, 4119 W. 177th St., Torrance, Calif.
Filed June 17, 1964, Ser. No. 375,760
4 Claims. (Cl. 30—358)

This invention is that of an electrical outlet box, and the tool for installing the same; a tool that, it will be seen from reading this specification and examining the accompanying drawing, will greatly simplify and reduce the time of this operation that is necessary many times by electrical contractors when a new home or office building is erected, or modifications made in existing structures.

Even the most experienced in the electrical wiring art sometimes experience difficulties, and must always be exceptionally careful in cutting through the interior wall of a building in order to get the right size opening, at the proper location, for the outlet box which is located on the opposite side of the wall.

It is, therefore, the principal object of this invention to provide an electrical outlet box, and a tool for installing the same, that makes it possible for even the most inexperienced person in the electrical and/or carpentry arts to install the same in a minimum of time and with as few tools as possible.

Another object of this invention is to provide an electrical outlet box, and a tool for installing the same, that makes it possible for one to actually use any ordinary electrical outlet box of the same size if they are inclined to do so.

Another object of this invention is to provide an electrical outlet box, and a tool for installing the same, that can be packaged and retailed for use by anyone desiring to install an electrical outlet box in a building.

Another object of this invention is to provide an electrical outlet box, and a tool for installing the same, the tool of which is a simple one-piece device that has an indefinite life and which never requires any adjustment or special care.

Still another object of this invention is to provide an electrical outlet box, and a tool for installing the same, that may be adapted to any wall regardless of its material other than a metal one.

These objects are accomplished by the structure and device and relative arrangement of the same, as will fully appear by a perusal of the following specification and claims.

Figure 1:
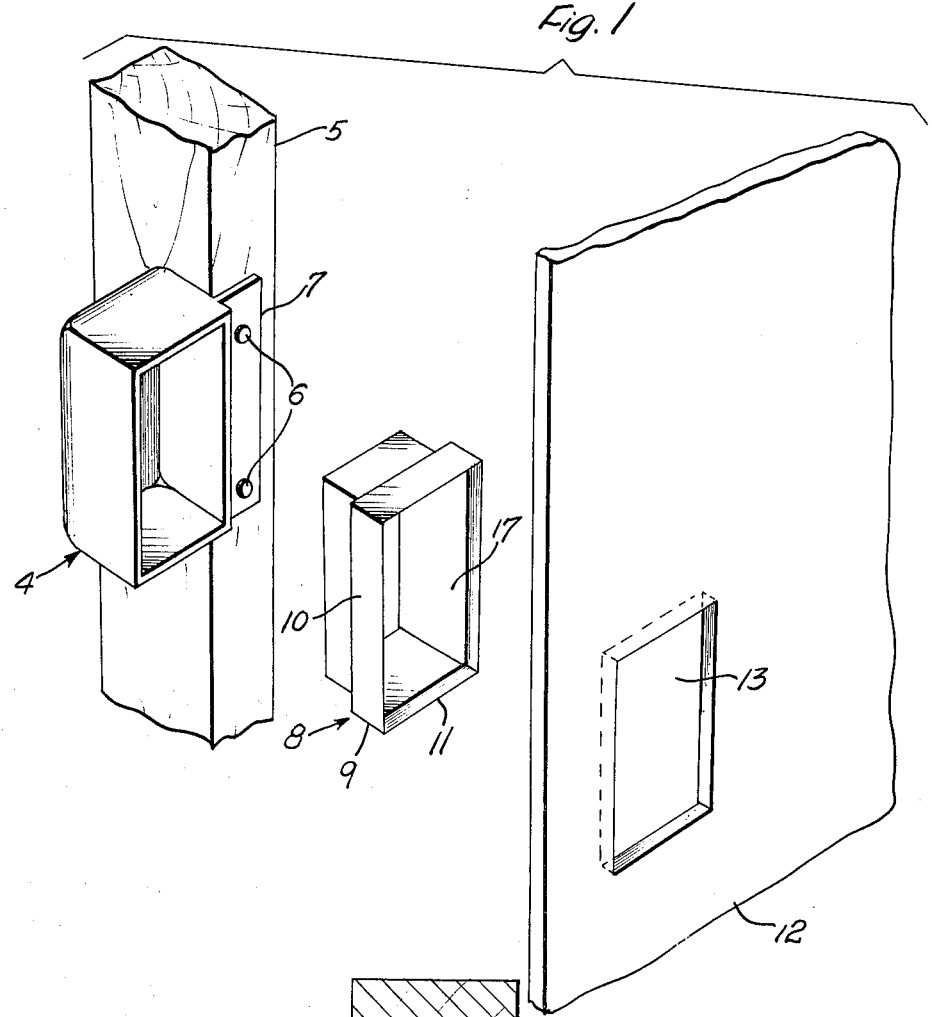
FIGURE 1 is an exploded view of an electrical outlet box secured to a typical vertical member of a building, with this installation tool and wallboard lined up, the wallboard having a rectangular opening which has been cut by the installation tool.

Referring now more particularly to the drawing, the reference character 4 indicates the electrical outlet box of the type usually used to house an outlet or switch on the side of a wall of a building. The outlet box 4 is secured to the wooden upright 5 by means of two nails 6, or their equivalent, passing through the flange 7 of the aforesaid electrical outlet box 4. The flange 7, of course, being integral with the outlet box, altho this is not absolutely necessary.

Looking now at the drawing, it will be seen that the tool portion of this invention is indicated by the reference number 8, and consists of a hollow rectangular metal frame 9, having outside dimensions that are equal to the outside dimensions of the electrical outlet box 4. The hollow rectangular frame 9 has its outside surface cut back at 10 to a point that the rest of the outside surface of this tool has the same dimensions as that of the inside of the aforesaid outlet box 4, in which this tool is placed after the outlet box has been secured to the aforesaid wooden upright 5, as is clearly shown in FIGURE 2 of the drawing, where it is also noted that the front edge 11 of this tool is perfectly bevelled to provide a sharp cutting edge against which the inside surface of the wallboard 12 rests when one is cutting the rectangular opening 13 by placing the cutting block 14 against the outside surface of the wallboard and giving it a sharp blow with a hammer. Continuing to look at the drawing, and particularly at FIGURE 2, one will see that the aforesaid cutting block 14, which is preferably made of wood, has its maximum frontal dimensions equivalent to those of the maximum frontal dimensions of the aforesaid tool 8, and that the periphery of this block is bevelled at 15 to the demarcation line 16 where it, the periphery of the block, is formed at an obtuse angle to the bevel thereby becoming parallel with the inside surface 17 of the aforesaid tool 8 into which it, the cutting block 14, will slidably fit after the tool has cut through the aforesaid wallboard 12.

Figure 2:
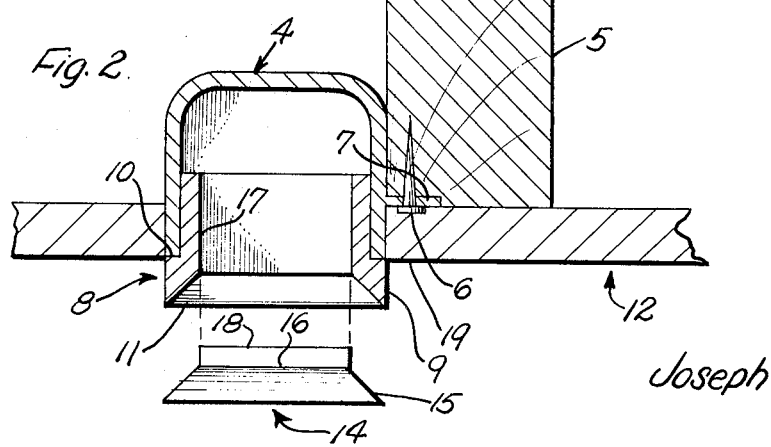
FIGURE 2 is a horizontal sectional view of this electrical outlet box and installation tool, just after the opening has been cut in the wallboard for the outlet box, by the installation tool and cutting block which is also shown in this view.

From the foregoing description of the electrical outlet box 4 and the tool 8, as well as the cutting block 14, one can see that after the electrical outlet box 4 has been secured to the aforesaid wooden upright 5, all one has to do to be sure of having a correctly located and neat opening of the right size in the aforesaid wallboard 12 is to place the tool 8 in the outlet box 4, and then stand the aforesaid wallboard 14 up against the same in the position that the wallboard is to be secured and with the sharp cutting edge of tool 8 against the inner surface of the wallboard. The approximate position of the box is known and the exact location can be determined by tapping lightly with a hammer. One can then take the cutting block 14 in hand and place it with its flat surface 18 up against the surface 19 of the wallboard 12, and then give the block a sharp blow with a hammer (not shown in the drawing). Remove the wallboard away from the wall, remove the tool 8 from the electrical outlet box 4, and of course the rectangular block that has been cut by the above described operation will fall from the wallboard 12, thereby permitting one to place the wallboard flat up against the wooden uprights 5 with the front edge of the outlet box 4 now snugly projecting through the rectangular opening in wallboard 4. The front edges of the outlet box will of course be even with the front surface 19 of the wallboard 12, as shown in FIGURE 2 of the drawing.

While this specification sets forth in detail the present and preferred construction of the device, still in practice such deviations may be resorted to as do not form a departure from the spirit of the invention, as set forth and defined by the appended claims.

Having thus described the invention, the following is claimed as new and useful, and upon which Letters Patent may be desired:

1. An electrical outlet box and tool for installing the same, comprising an electrical outlet box secured to the upright of an interior wall partition of a building, and a tool in the shape of a hollow frame adapted to be placed inside of the said electrical outlet box when one is ready to make an opening in the sheet of wallboard that is to be secured to the said upright, thereby forming the said interior wall partition, the said hollow frame being provided with a sharp periphery facing the said sheet of wallboard, and a cutting block adapted to be placed against the outer surface of the said sheet of wallboard and in line with the said hollow frame, the said cutting block to be struck a sharp blow thereby cutting the desired opening in the said wallboard, after which the said tool is removed from the said electrical outlet box and the said sheet of wallboard is secured to the upright with the front portion of the said electrical outlet box projecting through the opening cut in the said sheet of wallboard and flush with the front surface of the said sheet of wallboard.

2. An electrical outlet box and tool for installing the same, comprising an electrical outlet box secured to the upright of an interior wall partition of a building, and a tool in the shape of a hollow metal frame adapted to be placed inside of the said electrical outlet box when one is ready to make an opening in the sheet of wallboard that is to be secured to the said upright, thereby forming the said interior wall partition, the said hollow frame being provided with a sharp periphery facing the said sheet of wallboard, and a cutting block adapted to be placed against the outer surface of the said sheet of wallboard and in line with the said hollow frame, the said cutting block to be struck a sharp blow thereby cutting the desired opening in the said wallboard, after which the said tool is removed from the said electrical outlet box and the said sheet of wallboard is secured to the upright with the front portion of the said electrical outlet box projecting through the opening cut in the said sheet of wallboard and flush with the front surface of the said sheet of wallboard.

3. An electrical outlet box and tool for installing the same, comprising an electrical outlet box secured to the upright of an interior wall partition of a building, and a tool in the shape of a hollow metal frame adapted to be placed inside of the said electrical outlet box when one is ready to make an opening in the sheet of wallboard that is to be secured to the said upright, thereby forming the said interior wall partition, the said hollow frame having an inwardly bevelled and sharp periphery facing the said sheet of wallboard, and a cutting block adapted to be placed against the outer surface of the said sheet of wallboard and in line with the said hollow frame, the said cutting block to be struck a sharp blow thereby cutting the desired opening in the said wallboard, after which the said tool is removed from the said electrical outlet box and the said sheet of wallboard is secured to the upright with the front portion of the said electrical outlet box projecting through the opening cut in the said sheet of wallboard and flush with the front surface of the said sheet of wallboard.

4. An electrical outlet box and tool for installing the same, comprising an electrical outlet box secured to the upright of an interior wall partition of a building, and a tool in the shape of a hollow metal frame adapted to be placed inside of the said electrical outlet box when one is ready to make an opening in the sheet of wallboard that is to be secured to the said upright, thereby forming the said interior wall partition, the said hollow frame having an inwardly bevelled and sharp periphery facing the said sheet of wallboard, and a wooden cutting block adapted to be placed against the outer surface of the said sheet of wallboard and in line with the said hollow frame, the periphery of the said wooden cutting block is bevelled in part and adapted to slidably fit into the said tool when the said cutting block to be struck a sharp blow thereby cutting the desired opening in the said wallboard, after which the said tool is removed from the said electrical outlet box and the said sheet of wallboard is secured to the upright with the front portion of the said electrical outlet box projecting through the opening cut in the said sheet of wallboard and flush with the front surface of the said sheet of wallboard.

References Cited by the Examiner

UNITED STATES PATENTS 2,830,662   4/1958   Marcum _____ 30—358

FOREIGN PATENTS 1,063,625   8/1959   Germany.

WILLIAM FELDMAN, *Primary Examiner.*

R. V. PARKER, Jr., *Assistant Examiner.*